(12) United States Patent
Cheiky et al.

(10) Patent No.: US 7,488,558 B2
(45) Date of Patent: *Feb. 10, 2009

(54) HOMOGENEOUS SEPARATOR

(76) Inventors: Michael Cheiky, 3302 Bordeo La., Thousand Oaks, CA (US) 91362; Wilson Hago, 52 N. Ash St., Ventura, CA (US) 93001

( * ) Notice: Subject to any disclaimer, the term of this patent is extended or adjusted under 35 U.S.C. 154(b) by 174 days.

This patent is subject to a terminal disclaimer.

(21) Appl. No.: 10/845,465

(22) Filed: May 12, 2004

(65) Prior Publication Data

US 2005/0191557 A1    Sep. 1, 2005

Related U.S. Application Data

(63) Continuation-in-part of application No. 09/839,324, filed on Apr. 19, 2001, now abandoned.

(51) Int. Cl.
*H01M 2/16* (2006.01)
*C08B 16/00* (2006.01)
*C08B 1/00* (2006.01)

(52) U.S. Cl. .............................. 429/255; 536/56; 536/57

(58) Field of Classification Search ........................ None
See application file for complete search history.

(56) References Cited

U.S. PATENT DOCUMENTS

| | | | |
|---|---|---|---|
| 3,754,877 A * | 8/1973 | Klug | ........................... 44/267 |
| 4,067,689 A * | 1/1978 | Perrier et al. | .................. 8/129 |
| 4,352,770 A * | 10/1982 | Turbak et al. | ................ 264/187 |
| 4,367,191 A | 1/1983 | Cuculo et al. | |
| 4,919,865 A | 4/1990 | Nelson | |
| 5,155,144 A | 10/1992 | Manganaro et al. | |
| 5,342,659 A | 8/1994 | Horowitz et al. | |
| 5,763,557 A | 6/1998 | Sanduja et al. | |
| 5,942,354 A | 8/1999 | Oxley et al. | |
| 5,962,161 A | 10/1999 | Zucker | |
| 6,033,806 A | 3/2000 | Sugiura et al. | |
| 6,051,335 A | 4/2000 | Dinh-Sybeldon et al. | |
| 6,054,084 A | 4/2000 | Khavari | |
| 6,068,619 A | 5/2000 | Hamajima et al. | |
| 6,258,488 B1 | 7/2001 | Askew et al. | |
| 6,733,920 B2 | 5/2004 | Cheiky et al. | |
| 7,029,792 B2 * | 4/2006 | Cheiky et al. | ................ 429/229 |

FOREIGN PATENT DOCUMENTS

SU        651436 A        3/1979

* cited by examiner

*Primary Examiner*—Jonathan Crepeau
(74) *Attorney, Agent, or Firm*—Honigman Miller; Andrew N. Weber; Jonathan P. O'Brien

(57) ABSTRACT

A battery separator for use in zinc alkaline batteries having improved mechanical strength and higher resistance to oxidation comprising cellulose that has been crosslinked with a saturated hydrocarbon group containing between four and sixteen carbon atoms.

19 Claims, No Drawings

HOMOGENEOUS SEPARATOR

CROSS-REFERENCE TO RELATED APPLICATION

This application is a continuation-in-part of Ser. No. 09/839,324 filed Apr. 19, 2001 now abandoned.

TECHNICAL FIELD

This invention relates to a separator for an alkaline battery and more particularly to a cellulose separator for use in a secondary zinc alkaline battery.

BACKGROUND OF THE INVENTION

Separators play a crucial role in alkaline batteries. They keep the positive and negative sides of the battery separate while letting certain ions go through and blocking others. The separator is a passive element that has to perform the same task unchanged for the life of the battery. Additionally, the separator must be able to withstand a strongly alkaline environment at ambient and elevated temperatures and be able to resist oxidative attacks.

To meet the high current demands of modern electronics, there is an increasing need for an alkaline battery that contains a separator that can conduct hydroxyl ions at an increasingly rapid rate. Films of cellulose in the form of regenerated cellulose have been used since World War II as the separators of choice for this purpose because of their superior ability to conduct hydroxyl ions in strongly alkaline media. Their low electrical resistance of 10 milliohm-in$^2$ has also led to their widespread use among manufactures of zinc-based type batteries. These types of batteries include, among others, silver-zinc, zinc-nickel, and zinc manganese dioxide based batteries. Additionally, the cellulose acts as a physical barrier to migration of other ions into the battery, particularly, zincate ions and silver ions in a silver-zinc battery.

In the presence of a silver cathode, regenerated cellulose performs a sacrificial role as all of the active centers are oxidized in the presence of silver ions with the simultaneous deposition of silver metal. This can have a deleterious effect on the water transport as well as the ionic conductivity of the membrane.

Limited developments have occurred in the improvement of regenerated cellulose as a battery separator. Regenerated cellulose films are the result of extensive processing of cellulose and involve a xanthation reaction thereof. Cellophane, manufactured by regeneration from cellulose, has a degree of polymerization between 350 and 500. However, the regenerated cellulose separators presently used in zinc alkaline batteries do not have sufficient mechanical strength to withstand penetration by zinc dendrites and are subject to oxidation.

STATEMENT OF THE PRIOR ART

There have been different attempts to treat the surface of regenerated cellulose chemically. In the U.S. Pat. No. 5,763,557 Sanduja et al graft a polymer on to the surface of a film of cellophane by contacting the film with a solution of silver nitrate and an alkali-metal hydroxide and then contact the film with a polymerizable monomer and a catalyst. Polymerization takes place directly on the surface molecules of the substrate. Similar techniques are used in U.S. Pat. No. 5,342,659. There is no evidence, however, that surface treatment of regenerated cellulose significantly affects the ionic conductivity of a separator formed from the surface treated material.

Crosslinking tends to increase dimensional stability and tensile strength. Various techniques are know to crosslink cellulose, either intramolecularly, intermolecularly, or both. Indeed it is know that crosslinking affects the mechanical properties of cellulose fibers. U.S. Pat. No. 6,068,619 discloses the use of crosslinked cellulose fibers using 5% of dimethyloldihydroxyehtyleneurea as the crosslinking agent with 5% of a metal salt catalyst to improve the elasticity of fibers in the wet state. It is noted that crosslinked cellulose fibers by themselves absorb less liquid than uncrosslinked fibers.

Polyvinyl alcohol is a polymer that, when crosslinked, has been used as a battery separator. Polyvinyl alcohol is a substance containing two hydroxyl units per repeating unit. Sugiura et al in U.S. Pat. No. 6,033,806 propose its use as a battery separator in a method entailing cleaving diol units using an oxidative agent and then crosslinking the diols using an acetalization reaction. This is necessary in order to convert the normally water-soluble polymer into a water-insoluble polymer. Crosslinked polyvinyl alcohol, however, tends to have a higher electrical impedance than cellophane.

STATEMENT OF THE INVENTION

The present invention provides mechanically strong separators that are resistant to silver oxidation. This has been achieved by dissolving cellulose and crosslinking it in a manner as to preserve the excellent ionic conductivity. A battery separator is provided by forming a cellulose solution containing cellulose having a degree of polymerization between 200 and 1200. The cellulose is crosslinked with a saturated hydrocarbon group containing 4 and 16 carbon atoms. The cellulose solution is then coagulated to produce a gel that upon dehydration yields a film useful as a battery separator. This separator has higher mechanical strength than uncrosslinked separators.

DETAILED DESCRIPTION OF THE INVENTION

The present invention discloses a battery separator having improved strength than the native strength of regenerated cellulose. The separator is more resistant to oxidation than regenerated cellulose. The invention proceeds by crosslinking dissolved cellulose and forming a film from this crosslinked cellulose.

Cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC, the preferred range is 3 to 8% wt LiCl to DMAC and the applicable range for the percent weight solution of cellulose to solvent is 1 to 11%.

After dissolving the cellulose, the hydroxyl groups on the cellulose are deprotonated by adding an amount of a base, in particular an inorganic hydroxide such as NaOH. The base is added in sufficient quantity to deprotonate just a small fraction of available hydroxyls, usually 1 to 10%, for an excess would result in side reactions causing chain cleavage with consequent depolymerization and degradation in film strength.

After the deprotonation is complete, a saturated hydrocarbon dihalide containing 4 to 16 carbon atoms, preferably a saturated alkylene dihalide containing 4-12 carbon atoms, is introduced into the reaction vessel. The dihalide reacts with deprotonated sites on adjacent cellulose chains to form saturated hydrocarbon cross-link groups. The cross-linking reaction is preferably conducted at temperatures from 55 to 90 degrees Celsius for periods ranging from 8 to 24 hours. The amount of saturated dihalide added is at least the gram-equivalent to all of the hydroxyls available. The NaOH is allowed to settle and the solution is then formed into a membrane via conventional methods, well know to those skilled in the art of membrane fabrication. They include extrusion of the solution onto a conveyor belt, casting onto a glass plate with a casting knife or casting onto a well-leveled glass plate for form a separator having a thickness from 10 microns to 250 microns.

After casting, the resulting solution is coagulated by conventional techniques, preferably using water as the coagulating agent. Coagulation may be attained either by exposure to ambient moisture of by direct application of a water stream to the resulting solution. The coagulated cellulose material is washed to remove the solvent and the salt from the resulting gel. It is possible to employ alcohols mixed with water, but it is preferable that the alcohol be kept below 50% by volume.

After thorough washing of the gel, the gel may be dried with any conventional technique such as air drying, vacuum drying or press drying.

EXAMPLE 1

100 g of LiCl is dissolved in 2 kg of dimethylacetamide (DMAC) at room temperature. 40 g of microcrystalline cellulose (MCC, Aldrich 31,069-7) is placed in a solution containing 2.1 kg of LiCl/DMAC solvent and heated to 120 degrees Celsius for 15 minutes. The cooled solution is clear. 16 grams of NaOH is added to this solution and the solution is brought to 90 degrees Celsius for 3 hours. The solution is allowed to cool to 70 degrees Celsius at which point 63 g of 1,6-diiodohexane is added for 16 hours.

The solution is cooled to room temperature and cast on a glass-tray. After gelling with ambient moisture the gel is rinsed with deionized water to remove all solvent. The clean gel is placed in a dry-press mount at 105 degrees Celsius for 1.5 hours at which point a clear film is obtained.

Different celluloses were subjected to crosslinking as described in Example 1. The dried films were then subjected to a strength test as follows. A one inch squared piece of film is first soaked for 2 minutes in an aqueous solution comprising 50% by weight potassium hydroxide. It is clamped between two flat surfaces having openings slightly smaller than the film area. Next the film is stressed using a penetrometer with a spherical Teflon ball of ½ inch diameter at the tip. The weight to rupture is noted. Table 1 shows rupture weight in Newtons. Reported results are averages of several readings. The as cast data refer to celluloses of different degree of polymerization obtained from several vendors:

TABLE 1

| Film | As Cast | Crosslinked |
|---|---|---|
| Cellulose A | 2.5 | 3.0 |
| Cellulose B | 2.4 | 3.8 |
| Cellulose C | 5.1 | 6.7 |
| Cellulose D | 7.5 | 8.3 |
| Cellulose E | 7.1 | 9.1 |
| Cellulose F | 0.8 | 1.5 |
| Cellulose G | 2.7 | 3.3 |
| Cellulose H | 3.2 | 4.1 |
| Cellulose I | 3.5 | 3.5 |

Samples from the same films as above were placed in a bath of 50% KOH at 50 degrees Celsius for two weeks. Table 2 below reports rupture weights in Newtons for these films.

TABLE 2

| Film | As Cast | Crosslinked |
|---|---|---|
| Cellulose A | 0.55 | 0.58 |
| Cellulose B | 0.20 | 0.60 |
| Cellulose C | 0.40 | 0.80 |
| Cellulose D | 0.30 | 0.90 |
| Cellulose E | 0.60 | 0.70 |
| Cellulose F | 0.00 | 0.20 |
| Cellulose G | 0.25 | 0.80 |
| Cellulose H | 0.50 | 0.60 |
| Cellulose I | 0.15 | 0.45 |

EXAMPLE 2

Example 1 was repeated, except that 40 g 1,10-diiododecane is added as the crosslinking agent.

EXAMPLE 3

20 g of powered cellulose (International filler Corporation) is dissolved in 2 kg of 5% LiCl/DMAC and heated to 130 degrees Celsius for 1 hour. The solution is cooled and 18 g of NaOH and 36 g of 1,6-diiodohexane are added simultaneously and brought to the indicated temperature for a certain amount of time. The film is gelled, rinsed and dried as outlined in Example 1.

Experiments conducted using the crosslinked cellulose as described above in the separators of zinc alkaline batteries have indicated a measurable increase in mechanical strength.

It is to be realized that only preferred embodiments of the invention have been described and that numerous substitutions, modifications and alterations are permissible without departing from the spirit and scope of the invention as defined in the following claims.

What is claimed is:

1. A separator for use in an alkaline zinc alkaline battery comprising;
   a cellulose film regenerated from a solution of cellulose, said cellulose have saturated hydrocarbon cross-links containing 4 to 16 carbon atoms, said cross-links obtained by a nucleophilic substitution reaction, and said cross-links are attached to hydroxyl sites on the cellulose.

2. A separator according to claim 1 in which 0.5% to 10% of the available hydroxyl sites contain said cross-links.

3. A separator according to claim 2 in which the cross-linking agent is a saturated alkylene chain containing 4 to 12 carbon atoms.

4. A separator according to claim 3 in which saturated alkylene is selected from the group consisting of hexyl and decyl.

5. A zinc alkaline battery combining in combination;
   an alkali resistant battery case;
   a body of alkaline electrolyte;
   a zinc electrode having a portion thereof in contact with said body of electrolyte;
   a counter electrode having a portion thereof in contact with said body of electrolyte; and
   a cellulose separator disposed between said electrodes having no more than 10% of hydroxyl sites on cellulose chains cross-linked with a saturated hydrocarbon group containing 4 to 16 carbon atoms, obtained via a nuclophilic substitution reaction.

6. A battery according to claim 5 in which the saturated hydrocarbon group is a saturated alkylene group containing 6 to 12 carbon atoms.

7. A battery according to claim 6 in which the cellulose is selected from the group consisting of microcrystalline cellulose, microgranular cellulose, cotton fiber and paper.

8. A battery according to claim 7 in which the counter electrode comprises silver.

9. A method of forming a separator for an alkaline zinc alkaline battery comprising the steps of:
- dissolving cellulose in an organic solvent to form a solution;
- deprotonizing from 0.5% to 10% of hydroxyl groups on the cellulose;
- adding a saturated hydrocarbon polyhalide cross-linking agent containing 4 to 16 carbon atoms to the solution and reacting the halide atoms with the deprotonizing sites to form cross-links;
- forming a film of said solution containing cross-linked cellulose; and
- drying the film to form a separator.

10. A method according to claim 9 in which the separator has a thickness from 12 microns to 250 microns.

11. A method according to claim 10 in which the cellulose is selected from the group consisting of microgranular cellulose, cotton fiber, paper and microcrystalline cellulose.

12. A method according to claim 11 in which the cellulose has a degree of polymerization from 200 to 1200.

13. A method according to claim 9 in which substantially all the deprotonized sites are reacted with the saturated dihalide cross-linking agent.

14. A method according to claim 9 in which the halide is an iodide.

15. A method according to claim 9 in which the solvent comprises a polar aprotic solvent and an alkali metal salt.

16. A method according to claim 15 in which the 3 to 8% by weight of the alkali metal salt is present based on weight of polar aprotic solvent.

17. A method according to claim 16 in which the metal salt is lithium chloride and the polar aprotic solvent is DMAC.

18. A method according to claim 15 in which the solvent is present in the solution in an amount of 1 to 11% by weight.

19. A method according to claim 9 in which the cellulose is deprotonized by adding an inorganic base to the solution.

* * * * *